(12) United States Patent
Morey

(10) Patent No.: US 12,152,521 B2
(45) Date of Patent: Nov. 26, 2024

(54) SYSTEM FOR COOLING A DIESEL EXHAUST FLUID

(71) Applicant: CNH Industrial America LLC, New Holland, PA (US)

(72) Inventor: Daniel Alan Morey, Mundelein, IL (US)

(73) Assignee: CNH Industrial America LLC, New Holland, PA (US)

( * ) Notice: Subject to any disclaimer, the term of this patent is extended or adjusted under 35 U.S.C. 154(b) by 709 days.

(21) Appl. No.: 16/749,380

(22) Filed: Jan. 22, 2020

(65) Prior Publication Data

US 2021/0222601 A1   Jul. 22, 2021

(51) Int. Cl.
*F01N 3/20* (2006.01)
*F01N 3/02* (2006.01)
(Continued)

(52) U.S. Cl.
CPC .............. *F01N 3/2066* (2013.01); *F01N 3/02* (2013.01); *F02M 35/10268* (2013.01);
(Continued)

(58) Field of Classification Search
CPC ... F02M 35/10268; F01N 3/2066; F01N 3/02; F01N 2610/02; F01N 2610/11; F01N 2610/1406
(Continued)

(56) References Cited

U.S. PATENT DOCUMENTS 5,782,094 A * 7/1998 Freeman ............... A47F 3/0404
62/3.6
6,758,193 B1 * 7/2004 Kincaid ............... F02M 35/161
123/542
(Continued)

FOREIGN PATENT DOCUMENTS

DE    102015218457 A1    3/2017
DE    102016207174 A1    11/2017
(Continued)

OTHER PUBLICATIONS

DEF Storage Heaters; https://www.powerblanket.com/products/def-storage-heaters/ downloaded Jan. 22, 2020; 20 pags.
(Continued)

*Primary Examiner* — Jacob M Amick
*Assistant Examiner* — Omar Morales
(74) *Attorney, Agent, or Firm* — Rickard K. DeMille; Rebecca L. Henkel; Peter K. Zacharias

(57) ABSTRACT

A cooling system for cooling diesel exhaust fluid (DEF) for an off-road vehicle is provided. The system includes a DEF tank configured to hold DEF. The system includes a cooling interface configured to interface with the DEF. The system further includes a thermoelectric device disposed exterior to the DEF tank, wherein a first portion of the thermoelectric device is coupled to the cooling interface. The thermoelectric device is configured to draw heat from the cooling interface to cool the DEF. The system still further includes a heat sink coupled to a second portion of the thermoelectric
(Continued)

device opposite the first portion. The heat sink is configured to draw heat away from the thermoelectric device.

2 Claims, 5 Drawing Sheets

(51) Int. Cl.
  *F02M 35/10* (2006.01)
  *F01N 3/28* (2006.01)
(52) U.S. Cl.
  CPC ........ *F01N 3/2892* (2013.01); *F01N 2610/02* (2013.01); *F01N 2610/11* (2013.01); *F01N 2610/1406* (2013.01); *F01N 2610/1433* (2013.01); *F01N 2610/148* (2013.01)
(58) Field of Classification Search
  USPC ....................................................... 123/542
  See application file for complete search history.

(56) References Cited

U.S. PATENT DOCUMENTS

| | | | |
|---|---|---|---|
| 7,986,870 B2 | 7/2011 | Brueck et al. | |
| 8,978,450 B2 | 3/2015 | Steinhauser et al. | |
| 9,091,193 B2 | 7/2015 | Morey et al. | |
| 9,636,998 B1 | 5/2017 | Ledoux et al. | |
| 9,719,392 B2 | 8/2017 | Trivedi et al. | |
| 2015/0128573 A1* | 5/2015 | Fletcher | F16K 3/18 60/284 |
| 2016/0108793 A1* | 4/2016 | Bezaire | F01N 13/14 312/293.3 |
| 2016/0169074 A1* | 6/2016 | Clayton, Jr. | F01N 3/2053 60/287 |
| 2017/0022864 A1 | 1/2017 | Monge-Bonini et al. | |
| 2017/0234194 A1 | 8/2017 | Denis | |
| 2018/0209320 A1 | 7/2018 | Dougnier et al. | |
| 2018/0209325 A1 | 7/2018 | Choi et al. | |
| 2018/0274423 A1 | 9/2018 | Kubota et al. | |

FOREIGN PATENT DOCUMENTS

| | | |
|---|---|---|
| KR | 101723754 | 4/2017 |
| WO | 9949957 A1 | 10/1999 |
| WO | 2012064253 | 5/2012 |

OTHER PUBLICATIONS

EP Application No. 21152706 Search Report dated Apr. 21, 2021, 6 pgs.

* cited by examiner

SYSTEM FOR COOLING A DIESEL EXHAUST FLUID

BACKGROUND

The present disclosure relates generally to a system for cooling of a diesel exhaust fluid in a diesel exhaust fluid tank.

Certain off-road vehicles (e.g., agricultural vehicles such as tractors, combine harvesters, etc.) are powered by diesel engines and produce exhaust gas. The exhaust gas may include undesirable byproducts, such as nitrogen oxides (NOx), carbon monoxide, and particulate material. Traditional exhaust systems may spray a diesel exhaust fluid (DEF) into the flow of exhaust to reduce emissions. Typically, a tank for holding the DEF is located adjacent the fuel tank on the side where the main cabin door is located. The location of the DEF tank is exposed to multiple sources of heat (e.g., solar radiation, engine cooling air flow, etc.). These heat loads elevate the temperature of the DEF during operation, which may result in performance loss for the vehicle at high ambient temperature conditions.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment, a cooling system for cooling diesel exhaust fluid (DEF) for an off-road vehicle is provided. The system includes a DEF tank configured to hold DEF. The system includes a cooling interface configured to interface with the DEF. The system further includes a thermoelectric device disposed exterior to the DEF tank, wherein a first portion of the thermoelectric device is coupled to the cooling interface. The thermoelectric device is configured to draw heat from the cooling interface to cool the DEF. The system still further includes a heat sink coupled to a second portion of the thermoelectric device opposite the first portion. The heat sink is configured to draw heat away from the thermoelectric device.

In another embodiment, a cooling system for cooling diesel exhaust fluid (DEF) for an off-road vehicle is provided. The system includes a DEF tank configured to hold DEF. The system also includes a fluid circuit external to and coupled to the DEF tank. The system further includes a pump disposed along the fluid circuit and configured to pump the DEF to and from the DEF tank along the fluid circuit. The system still further includes a cooling interface disposed along the fluid circuit, wherein the cooling interface is configured to interface with the DEF. The system even further includes a thermoelectric device disposed exterior to the DEF tank, wherein a first portion of the thermoelectric device is coupled to the cooling interface, and wherein the thermoelectric device is configured to draw heat from the cooling interface to cool the DEF. The system yet further includes a heat sink coupled to a second portion of the thermoelectric device opposite the first portion. The heat sink is configured to draw heat away from the thermoelectric device.

In a further embodiment, a cooling system for cooling diesel exhaust fluid (DEF) for an off-road vehicle is provided. The system includes a DEF tank configured to hold DEF. The system also includes a cooling interface coupled to the DEF tank. A portion of the cooling interface is configured to contact the DEF disposed within the DEF tank. The system further includes a thermoelectric device disposed exterior to the DEF tank. A first portion of the thermoelectric device is coupled to the cooling interface. The thermoelectric device is configured to draw heat from the cooling interface to cool the DEF. The system still further includes a heat sink coupled to a second portion of the thermoelectric device opposite the first portion. The heat sink is configured to draw heat away from the thermoelectric device.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
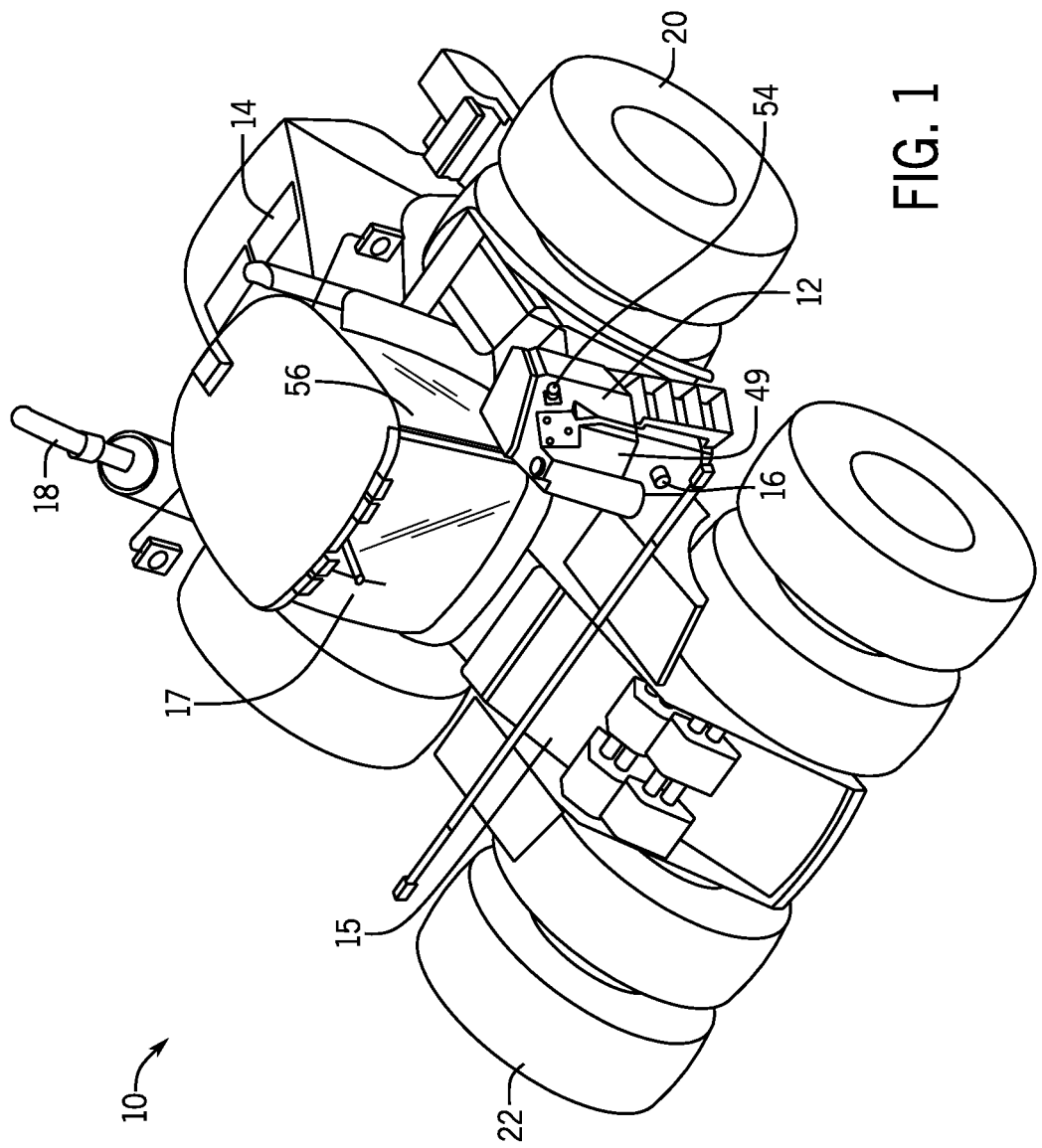
FIG. 1 is a perspective view of an embodiment of a work vehicle including a diesel exhaust fluid (DEF) tank.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

During operation of an off-road vehicle or a work vehicle (e.g., agricultural vehicles such as tractors, combine harvesters, etc.), diesel exhaust fluid (DEF) is injected into an exhaust stream of the vehicle to help reduce the generation of harmful pollutants (e.g., nitrogen oxides, carbon monoxide, and particulate material). An injector of the work vehicle's exhaust system injects the DEF into the exhaust stream from a DEF tank disposed on board the work vehicle.

To reduce non-value activity while servicing the work vehicle, the DEF tank is often positioned proximate a diesel fuel tank such that respective fill spouts for the fuel tank and the DEF tank are on the same side of the work vehicle (e.g., main cab door side of the work vehicle). However, such positioning of the DEF tank may place the DEF tank in the path of radiant engine heat and/or expose the DEF tank to solar radiation from direct sunlight, which may elevate the temperature of the DEF during operation. These heat loads, in combination with high ambient conditions (e.g., hot climate or low cloud cover), may increase the temperature of the DEF above a performance temperature threshold. Generally, the DEF in the DEF tank should be maintained under the performance temperature threshold, as some work vehicles may cut power to a work vehicle engine when the temperature of the DEF exceeds the performance temperature threshold. Thus, under some conditions, it is now recognizable that providing cooling to the DEF may be desirable.

Embodiments of the present disclosure provide for the cooling of the DEF. For example, as described in greater detail below, a thermoelectric cooling (TEC) device is provided for cooling DEF. A cooling interface is provided for interfacing with the DEF (e.g., directly or indirectly). The cooling interface absorbs rejected heat from the DEF fluid. The TEC device is disposed exterior to the DEF tank. The TEC device includes a first portion coupled to the cooling interface and a second portion opposite the first portion that is coupled to a heat sink (e.g., fins) that draws heat away from the TEC device. The TEC device draws heat from the cooling interface to cool the DEF. In certain embodiments, the cooling interface and the TEC device are coupled to a fluid circuit external to the DEF tank. A pump disposed along the fluid circuit may pump the DEF from the DEF tank and return it to the DEF tank once the DEF has been cooled via the TEC device. In certain embodiments, a fan may promote convective heat transfer at the heat sink. In other embodiments, the heat sink may be disposed within a duct (e.g., air intake duct) having an airflow that promotes convective heat transfer at the heat sink. In certain embodiments, an internal heat sink may be disposed within the DEF tank to directly contact the DEF and provide heat transfer via natural convection. The internal heat sink may be coupled to the TEC device disposed external to the DEF tank. In certain embodiments, the TEC device may be coupled to a controller. The controller may regulate (e.g., activate and control) the TEC device based on feedback from one or more sensors regarding a temperature of the DEF. The controller may regulate the TEC device to keep the temperature of the DEF at or below a predetermined threshold (e.g., 50 degrees Celsius or another temperature threshold based on engine type and design). Regulating the temperature (e.g., cooling) the DEF enables the vehicle to operate at full potential to maximize productivity. In addition, off-road or work vehicles may be utilized to greater effect in environments having higher ambient temperatures.

Turning now to the drawings, FIG. 1 is a perspective view of an embodiment of an off-road or work vehicle 10 including a DEF tank 12. The work vehicle 10 may be an agricultural work vehicle (e.g., tractor, combine harvester, etc.). However, in some embodiments, the work vehicle 10 may be any suitable vehicle that utilizes DEF. As depicted, the work vehicle 10 includes a body 14 that houses an engine, transmission, cooling system, and power train (not separately shown), a diesel fuel tank 15 that may be filled via a fuel fill spout 16, the DEF tank 12 configured to hold DEF, a cabin 17 where an operator may sit or stand to operate the vehicle 10, an exhaust pipe 18, and four front wheels 20 and four rear wheels 22 that rotate to facilitate movement of the vehicle 10. Alternatively, the work vehicle 10 may have two or six front wheels 20 and/or rear wheels 22. In addition, the work vehicle 10 may have two tracks or four tracks instead of wheels.

Figure 2:
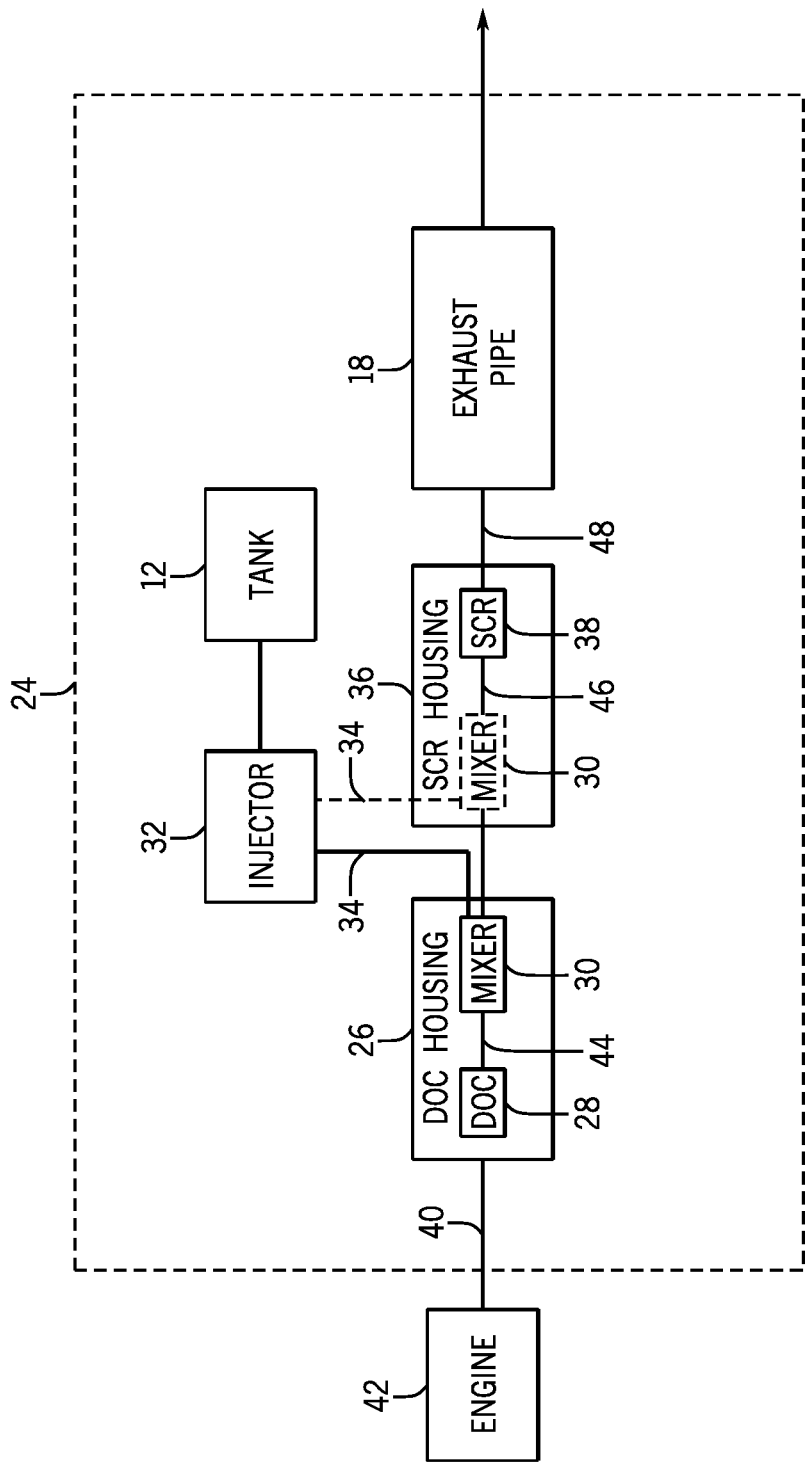
FIG. 2 is a block diagram of an embodiment of an exhaust system that may be employed within the work vehicle of FIG. 1.

As described in FIG. 2, an injector of the work vehicle's exhaust system may inject the DEF from the DEF tank 12 into an exhaust flow to reduce undesirable byproducts (e.g., pollutants). The exhaust system 24 may include a diesel oxidation catalyst (DOC) assembly having a housing 26 containing a DOC 28 and a mixer 30. The exhaust system 24 also includes the injector 32 for injecting DEF 34, the DEF tank 12, a selective catalytic reduction (SCR) housing 36 containing an SCR module 38, and the exhaust pipe 18. In some embodiments, the mixer 30 may be disposed within the SCR housing 36 instead of, or in addition to, the DOC housing 26. Certain embodiments of the exhaust system 24 may additionally include a diesel particulate filter to capture particulate matter, a muffler, or any other element suitable for use in an exhaust system.

The DOC housing 26 receives exhaust 40 expelled by the engine 42 and directs the exhaust 40 into the DOC 28. The DOC 28 receives the exhaust and catalyzes the oxidization of carbon monoxide to carbon dioxide by using excess oxygen in the exhaust 40. In addition, the DOC 28 uses excess oxygen to catalyze the conversion of hydrocarbons to water and carbon dioxide. In certain embodiments, the DOC 28 may use ceramics and/or metals (e.g., platinum or palladium) to catalyze the oxidization of the hydrocarbons and carbon monoxide molecules. Thus, the DOC 28 receives raw exhaust 40 and outputs catalyzed exhaust 44 with reduced concentrations of hydrocarbons and carbon monoxide.

The DOC housing 26 then directs the catalyzed exhaust 44 to the mixer 30. In the mixer 30, the injector 32 sprays DEF 34 from the DEF tank 12 into the exhaust 44. The DEF 34 is a solution used to reduce NOx within the exhaust 44. For example, in certain embodiments, the DEF 34 may include an aqueous urea solution that undergoes thermal decomposition and hydrolysis within the exhaust system 24 to produce ammonia, which the SCR 38 uses to convert the NOx into nitrogen and water. Thus, the mixer 30 supplies a well-mixed exhaust solution 46 (e.g., a mixture of the exhaust 44 and DEF 34) to the SCR module 38. The SCR module 38 receives the exhaust solution 46 and uses the distributed DEF 34 to reduce the NOx concentration in the exhaust gas. Finally, the SCR module 38 sends processed exhaust 48 with a reduced NOx concentration through the exhaust pipe 18 to be released into the atmosphere.

Returning to FIG. 1, the DEF tank 12 may be contained within the vehicle body 14. The DEF tank 12 includes a tank body 49 and a fill spout 54. In some embodiments, the DEF tank 12 is mounted to a portion of a work vehicle 10 proximate the diesel fuel tank 15 of the work vehicle 12. To reduce non-value activity (e.g., reduce the duration associated with replenishing the DEF and fuel), the DEF tank may be positioned proximate the diesel fuel tank 15 such that respective fill spouts 16, 54 for the diesel fuel tank 15 and the DEF tank 12 are on the same side of the work vehicle and an operator may replenish both the DEF tank 12 and the fuel tank 15 from the same side of the vehicle. Moreover, the DEF tank 12 may be mounted to portion of the work vehicle 10 proximate a main cab door 56 to the cabin 17 of the work vehicle 10. That is, the DEF tank 12 may be mounted proximate the side of the work vehicle 10 having the main cab door 56 such that the operator may exit the cabin 17 and replenish the DEF tank 12 and the fuel tank 15 without having to walk to an opposite side of the work vehicle.

Figure 3:
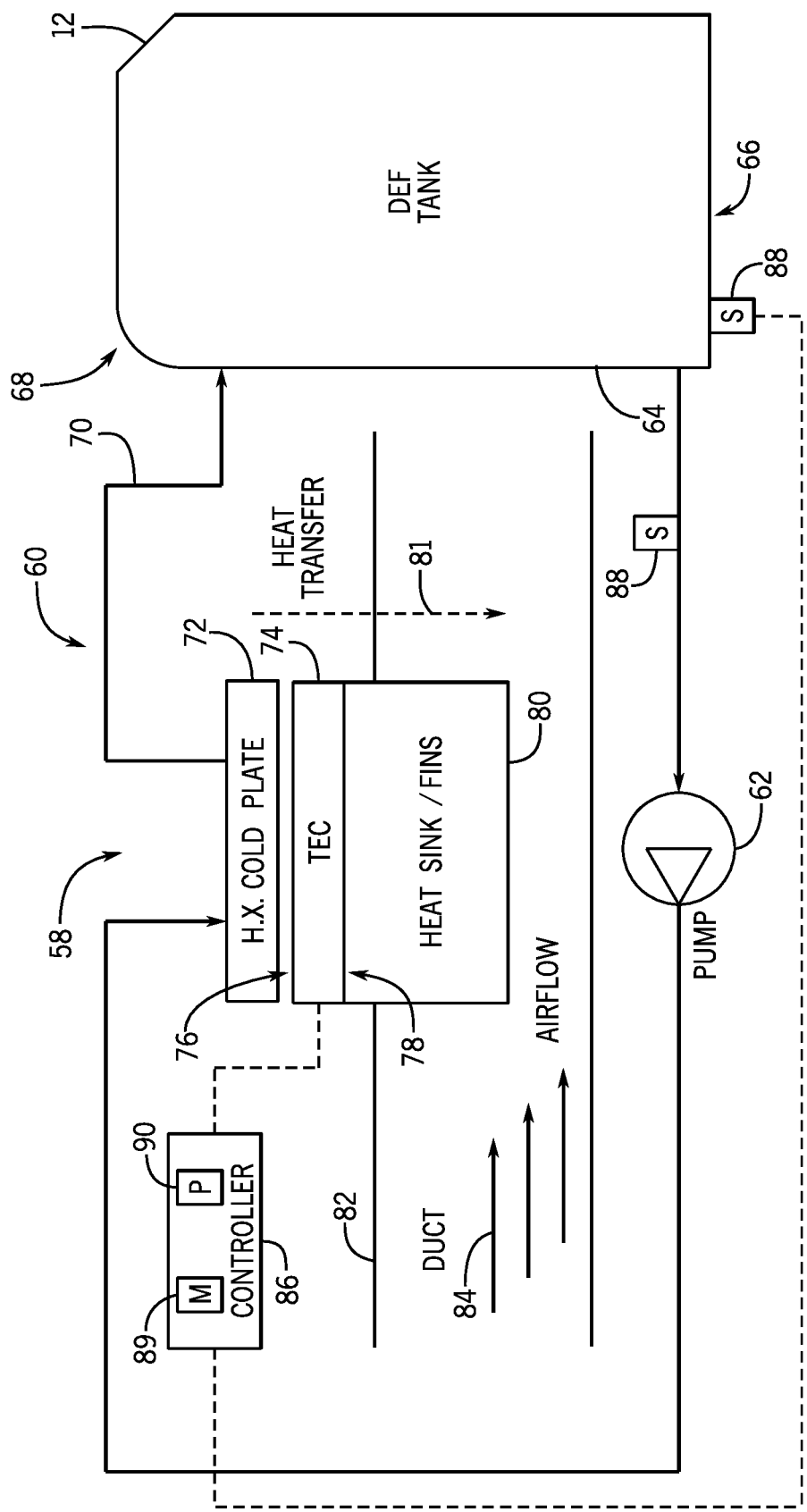
FIG. 3 is a block diagram of an embodiment of a cooling system for the DEF that may be employed within the work vehicle of FIG. 1.

FIG. 3 is a block diagram of an embodiment of a cooling system 58 (e.g., TEC cooling system) for the DEF that may be employed within the work vehicle 10 of FIG. 1. As the set forth above, the positioning of the DEF tank 12 may expose the DEF tank 12 to various heat loads (e.g., radiant engine heat and solar radiation), which in combination with high ambient conditions (e.g., hot climate and low cloud cover), may increase the temperature of the DEF above a performance temperature threshold. High temperature causes DEF to decompose, reducing the affectivity of the reagent. As a result, the engine reduces power to limit the output of pollutants so that the reduced capacity of the DEF affectivity does not result in non-compliance (e.g., with emission regulations). Thus, some work vehicles may cut or limit power to the engine in response to the temperature of the DEF rising above the performance temperature threshold. For example, some work vehicles may be configured to cut power to the engine when the DEF temperature rises above a performance temperature threshold. The performance temperature threshold may vary based on engine type and design. In certain embodiments, the performance temperature threshold may range from 40 to 60 degrees Celsius). In certain embodiments, the performance temperature threshold may be of fifty degrees Celsius (one hundred and twenty-two degrees Fahrenheit).

The cooling system 58 is configured to provide cooling to the DEF to reduce or eliminate engine shutdowns during high heat loads and ambient conditions. As depicted in FIG. 3, the cooling system 58 includes a fluid circuit 60 external to and coupled to the DEF tank 12. The cooling system 58 includes a pump 62 disposed along the fluid circuit 60. In certain embodiments, the pump 62 may be a positive displacement pump or dynamic (e.g., centrifugal) pump. The pump 62 drives or pumps the DEF from the DEF tank 12 (e.g., at a location on a sidewall 64 of the DEF tank 12 adjacent a bottom portion 66 of the DEF tank 12) along the circuit 60 for cooling of the DEF by the cooling system 58 before returning the DEF to the DEF tank 12 (e.g., at a location on the sidewall adjacent a top portion 68 of the DEF tank 12). In certain embodiments, the exit and entry of the DEF from the DEF tank 12 may occur at different locations than those depicted (e.g., bottom wall and top wall of the DEF tank, respectively). The fluid circuit 60 may be defined by a conduit 70 (e.g., piping or tubing).

The cooling system 58 includes a cooling interface or thermal interface 72 (e.g., heat exchange cold plate) disposed along the fluid circuit 60 (e.g., on a wall of the conduit 70). The cooling interface 72 interfaces (e.g., indirectly) with the DEF flowing through the circuit 60 to absorb waste heat from the DEF. The cooling system 58 includes a TEC device 74 disposed exterior to the DEF tank 12. The TEC device 74 includes a first portion or side 76 coupled to the cooling interface 72. A second portion 78 of the TEC device 74 (opposite the first portion 76) is coupled to a heat sink 80. The heat sink 80 draws heat away from the TEC device 74. The heat sink 80 may include a plurality of fins. The TEC device 74 is configured to actively draw heat from the cooling interface 72 to cool the DEF and to transfer the heat to the heat sink 80 as indicated by arrow 81. As depicted, the heat sink 80 is disposed within a duct 82 (e.g., air intake duct), wherein an airflow indicated by arrows 84 provides forced convective heat transfer at the heat sink 80. The duct 82 may be any suitable air duct before a turbocharger or after an engine charge air cooler. The duct 82 may also be a cab heating, ventilation, and air conditioning (HVAC) duct. The airflow 84 may be engine airflow, cab HVAC airflow, or engine cooling airflow.

Although the TEC device 74 has been discussed for use in cooling the DEF, the TEC device 74 may be utilized for heating or cooling purposes, and therefore may be communicatively coupled to a controller 86 for temperature control and monitoring. In certain embodiments, the TEC device 74 may use the Peltier effect to create a heat pump or a heat flux that transfers rejected heat from one location to another (e.g., from the DEF to the ambient air). For the purposes of the disclosed embodiments, rejected heat may be any undesired or excess heat having the potential to hinder the use of DEF. The TEC device 74 creates a temperature differential via a source of current. Specifically, in certain embodiments, two unique semiconductor materials (e.g., one N-type semiconductor material and one P-type semiconductor material) may be disposed (e.g., between plates) to generate the temperature differential. For example, a P-type semiconductor material may be placed thermally in parallel and electrically in series with an N-type semiconductor material. When a voltage is applied to the free ends of the plates, a flow of current across the junction of the plates causes the temperature differential, which results in a heat flux from one plate to the other plate. Accordingly, one plate (e.g., the cooling interface 72) may function as a cool side that absorbs rejected heat (e.g., from the DEF) and transfers the rejected heat to another plate, which may function as a hot side that transfers the heat into the heat sink 80.

As mentioned above, the TEC device 74 may be communicatively coupled to the controller 86. The controller 86 may receive feedback from one or more sensors 88 (e.g., temperature sensors) The sensors 88 may be coupled to the DEF tank 12 and/or disposed along the fluid circuit 60 to measure a temperature of the DEF. In certain embodiments, the sensor 88 may be disposed adjacent the bottom portion 66 of the DEF tank 66 since the temperature of the DEF near the bottom portion 66 of the DEF tank 12 is more relevant (since the DEF at the bottom 66 of the DEF tank will be utilized first). In response to the feedback, the controller 86 may regulate the temperature of the DEF. For example, the controller 86 may monitor the temperature of the DEF and compare to a predetermined or desired threshold (e.g., 50 degrees Celsius). If the temperature of the DEF surpasses the desired threshold, the controller 86 may utilize the TEC device 72 to cool the DEF to or below the desired threshold. In certain embodiments, the TEC device 74 may remain inactive until the controller 86 activates it (e.g., in response to the DEF exceeding the desired threshold). In certain embodiments, the controller 74 may keep the TEC device 74 active and actively regulate the temperature of the DEF to a desired temperature.

As mentioned above, the TEC device 74 may be communicatively coupled to the controller 86. The controller 86 may receive feedback from one or more sensors 88 (e.g., temperature sensors) The sensors 88 may be coupled to the DEF tank 12 and/or disposed along the fluid circuit 60 to measure a temperature of the DEF. In certain embodiments, the sensor 88 may be disposed adjacent the bottom portion 66 of the DEF tank 66 since the temperature of the DEF near the bottom portion 66 of the DEF tank 12 is more relevant (since the DEF at the bottom 66 of the DEF tank will be utilized first). In some embodiments, the sensor 88 may be disposed within the DEF tank 66. In other embodiments, the sensor 88 may be disposed at or adjacent the cooling interface 72 along the fluid circuit 60. In response to the feedback, the controller 86 may regulate the temperature of the DEF. For example, the controller 86 may monitor the temperature of the DEF and compare it to a predetermined or desired threshold (e.g., 50 degrees Celsius). If the temperature of the DEF surpasses the desired threshold, the controller 86 may utilize the TEC device 72 to cool the DEF to or below the desired threshold. In certain embodiments, the TEC device 74 may remain inactive until the controller 86 activates it (e.g., in response to the DEF exceeding the desired threshold). In certain embodiments, the controller 74 may keep the TEC device 74 active and actively regulate the temperature of the DEF to a desired temperature or to keep the DEF within a desired temperature range.

The controller 86 contains computer-readable instructions stored in memory 89 (e.g., non-transitory, tangible, and computer-readable medium/memory circuitry) and a processor 90 which executes the instructions. More specifically, the memory 89 may include volatile memory, such as random access memory (RAM), and/or non-volatile memory, such as read-only memory (ROM), optical drives, hard disc drives, or solid-state drives. Additionally, the processor 90 may include one or more application specific integrated circuits (ASICs), one or more field programmable gate arrays (FPGAs), one or more general purpose processors, or any combination thereof. Furthermore, the term processor is not limited to just those integrated circuits referred to in the art as processors, but broadly refers to computers, processors, microcontrollers, microcomputers, programmable logic controllers, application specific integrated circuits, and other programmable circuits. The processor 90 and memory 89 may be used collectively to support an operating system, software applications and systems, and so forth, useful implementing the techniques described herein. For example, the memory 89 may store temperature thresholds or ranges for the DEF.

Figure 4:
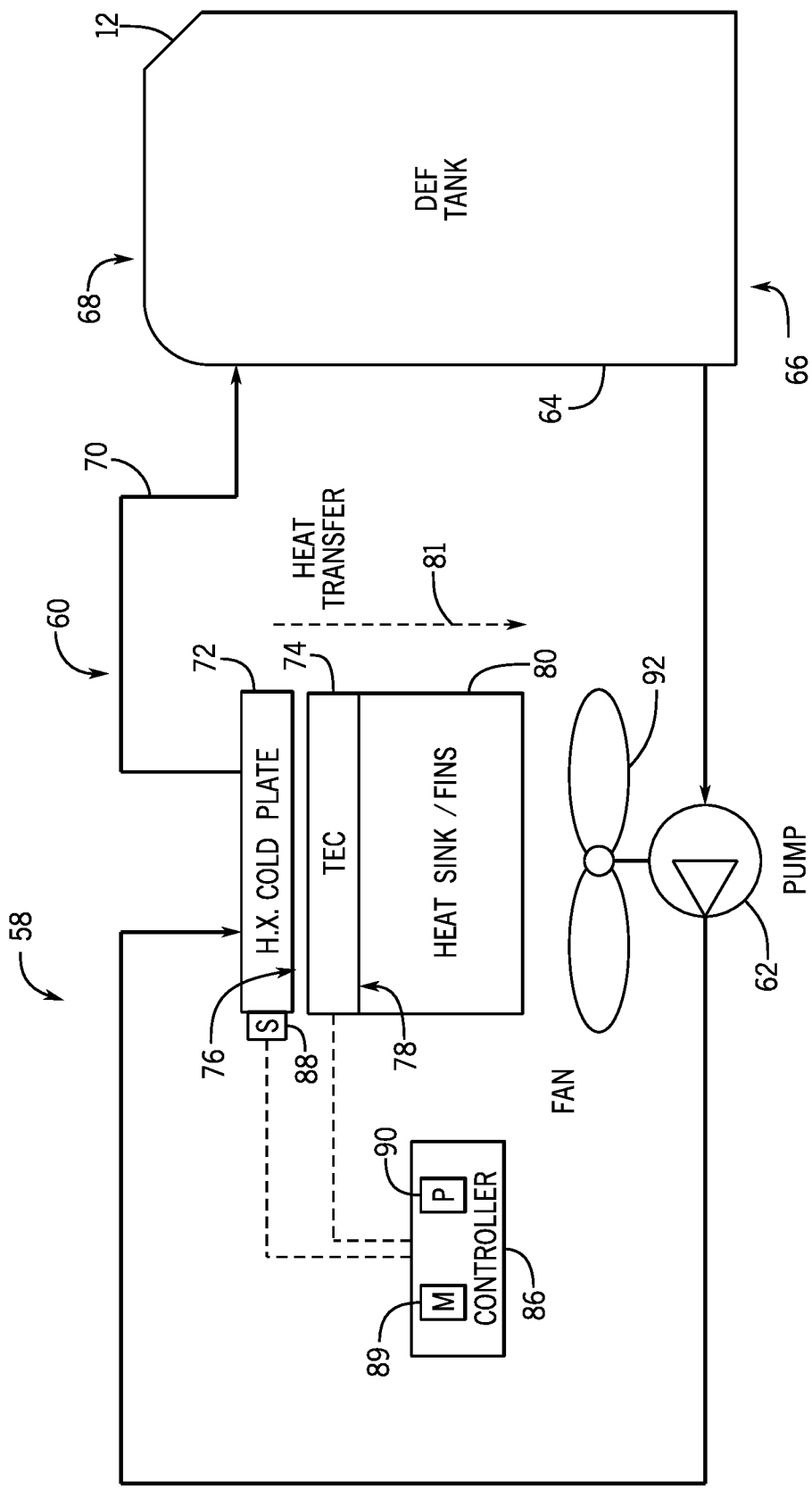
FIG. 4 is a block diagram of another embodiment of the cooling system that may be employed within the work vehicle of FIG. 1.
Figure 5:
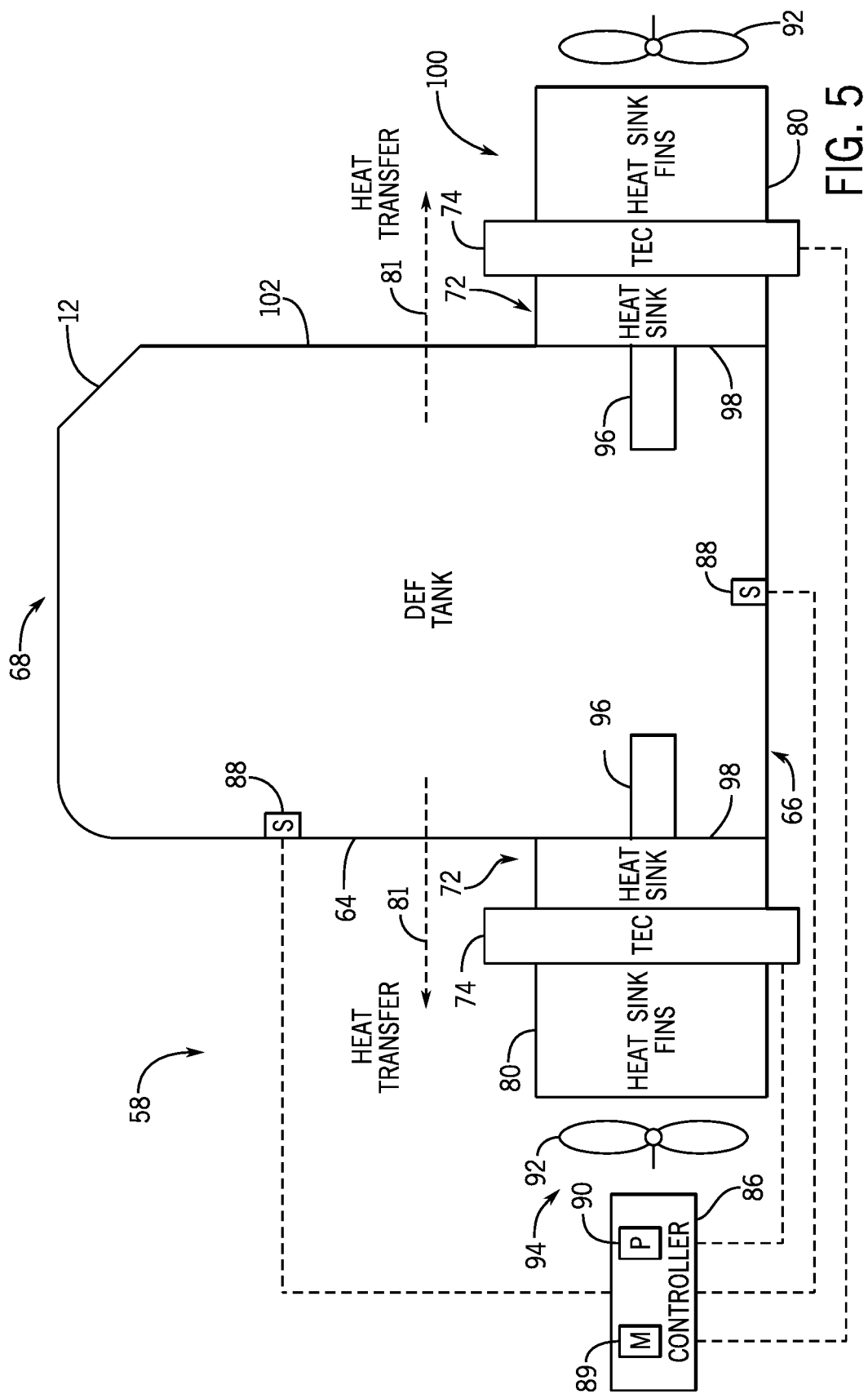
FIG. 5 is a block diagram of a further embodiment of the cooling system that may be employed within the work vehicle of FIG. 1.

FIG. 4 is a block diagram of another embodiment of the cooling system 58 that may be employed within the work vehicle 10 of FIG. 1. The cooling system 58 is as described in FIG. 3 with a few exceptions. For example, the heat sink 80 is not disposed within a duct. Instead, the heat sink 80 may be disposed within an engine bay area or exterior to the work vehicle 10. In addition, the sensor 88 (e.g., temperature sensor) is disposed along the fluid circuit at or adjacent the cooling interface 72. In certain embodiments, one or more sensors 88 may be disposed on or inside the DEF tank 12 (e.g., as shown in FIGS. 3 and 5, respectively). Further, a fan 92, via airflow, provides forced convective heat transfer at the heat sink 80. In certain embodiments, the pump 62 and the fan 92 may be driven by the same motor or power taken off a shaft. In other embodiments, the pump 62 and the fan 92 may be driven by separate sources.

FIG. 5 is a block diagram of a further embodiment of the cooling system 58 that may be employed within the work vehicle 10 of FIG. 1. The cooling system 58 in FIG. 5 does not need a pump or an external fluid circuit. The cooling system 58 includes a first cooling module 94. The cooling module 94 includes the cooling interface 72. The cooling interface 72 includes a first heat sink portion 96 (e.g., internal heat sink portion) disposed within the DEF tank 12 and a second heat sink portion 98 disposed external to the DEF tank 12 on the side wall 64 of the DEF tank 12. The TEC device 74, as described above, is coupled to the second heat sink portion 98 of the cooling interface 72. The heat sink 80, as described above, is coupled to the TEC device 74. The fan 92 provides forced convective heat transfer at the heat sink 80.

The first heat sink portion 96 directly contacts the DEF. The temperature gradient of the DEF within the DEF tank 12 provides natural convection for the transfer heat to the first heat sink portion 96. In addition, "sloshing" motion provides force convection for heat to transfer to the first heat sink portion 96. The heat is then transferred from the first heat sink portion 96 to the second heat portion 98, where it may be further transferred via the TEC device 74 to the heat sink 80 (and subsequently to the ambient air) as indicated by arrow 81.

The TEC device 74 is coupled to the controller 86. The controller 86 is coupled to sensors 88 (e.g., temperature sensors) disposed within the DEF tank 12 that measure the temperature of the DEF. As depicted, sensors 88 are disposed on the sidewall 64 and on the bottom portion 66 of the DEF tank 12. The controller 86 regulates the TEC device 74 and the temperature of the DEF as described above. In certain embodiments, the cooling system 58 may also include an additional cooling module 100 (similar to the cooling module), for example, disposed on an opposite sidewall 102 of the DEF tank 12. The TEC device 74 for the additional cooling module 100 may also be controlled via the controller 86.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A cooling system for cooling diesel exhaust fluid (DEF) for an off-road vehicle, comprising:
   a DEF tank configured to hold DEF;
   a fluid circuit external to and coupled to the DEF tank;
   a pump disposed along the fluid circuit and configured to pump the DEF to and from the DEF tank along the fluid circuit;
   a cooling interface disposed along the fluid circuit, wherein the cooling interface is configured to interface with the DEF;
   a thermoelectric device disposed exterior to the DEF tank, wherein a first portion of the thermoelectric device is coupled to the cooling interface, and wherein the thermoelectric device is configured to draw heat from the cooling interface to cool the DEF; and
   a heat sink coupled to a second portion of the thermoelectric device opposite the first portion, and wherein the heat sink is configured to draw heat away from the thermoelectric device.

2. The system of claim 1, wherein the heat sink is configured to be disposed within an air intake duct of the off-road vehicle, and wherein an air flow through the air intake duct is configured to cool the heat sink.

\* \* \* \* \*